US011619186B2

United States Patent
Bridge et al.

(10) Patent No.: US 11,619,186 B2
(45) Date of Patent: Apr. 4, 2023

(54) MANAGEMENT SYSTEM AND METHOD FOR REGULATING THE ON-DEMAND ELECTROLYTIC PRODUCTION OF HYDROGEN AND OXYGEN GAS FOR INJECTION INTO A COMBUSTION ENGINE

(71) Applicant: dynaCERT Inc., Toronto (CA)

(72) Inventors: David Bridge, Mississauga (CA); Ruston Jeroen Hoffman, Grimsby (CA)

(73) Assignee: dynaCERT Inc., Toronto (CA)

( * ) Notice: Subject to any disclaimer, the term of this patent is extended or adjusted under 35 U.S.C. 154(b) by 0 days.

(21) Appl. No.: 17/582,527

(22) Filed: Jan. 24, 2022

(65) Prior Publication Data

US 2022/0145483 A1     May 12, 2022

Related U.S. Application Data

(63) Continuation of application No. 17/184,005, filed on Feb. 24, 2021, now Pat. No. 11,268,458, which is a
(Continued)

(51) Int. Cl.
*F02D 41/00*     (2006.01)
*F02M 25/12*     (2006.01)
(Continued)

(52) U.S. Cl.
CPC ............ *F02D 41/0025* (2013.01); *C25B 1/04* (2013.01); *C25B 15/02* (2013.01); *C25B 15/027* (2021.01);
(Continued)

(58) Field of Classification Search
CPC .. F02D 41/0025; F02D 19/0671; F02D 41/28; F02D 2041/1412; F02D 2200/04;
(Continued)

(56) References Cited

U.S. PATENT DOCUMENTS 3,672,341 A     6/1972   Smith et al.
3,809,743 A *   5/1974   Barker ................. B01D 53/944
                                                423/213.7
(Continued)

FOREIGN PATENT DOCUMENTS

AU        2015218446 A1     3/2017
CA           1113037 A     11/1981
(Continued)

OTHER PUBLICATIONS

Non-final Office Action and Notice of References Cited dated Dec. 7, 2017 in U.S. Appl. No. 14/423,602 (15 pages).
(Continued)

*Primary Examiner* — Hung Q Nguyen
*Assistant Examiner* — Susan E Scharpf
(74) *Attorney, Agent, or Firm* — Bereskin & Parr LLP/ S.E.N.C.R.L., s.r.l.

(57) ABSTRACT

A system and method of managing an on-demand electrolytic reactor for supplying hydrogen and oxygen gas to an internal combustion engine. The system minimizes reactor's power consumption and parasitic energy loss generally associated with perpetual reactors. The system comprises a plurality of sensors coupled to the reactor measuring a plurality of reactor parameters, an electronic control unit coupled to the plurality of sensors and the engine, and a reactor control board coupled to the reactor and the electronic control unit. The electronic control unit: monitors the plurality of reactor parameters and the plurality of engine parameters; determines a reactor performance level; determines an engine performance level; determines a change in the engine performance level to forecast a future engine demand level; and determines an ideal reactor performance level corresponding to the engine performance level or the future engine demand level. The reactor control board
(Continued)

regulates the reactor by modifying at least one of electrical current supplied to the reactor, electrical voltage supplied to the reactor, and temperature of the reactor.

20 Claims, 10 Drawing Sheets

Related U.S. Application Data continuation of application No. 16/514,543, filed on Jul. 17, 2019, now Pat. No. 10,961,926, which is a continuation of application No. 15/298,783, filed on Oct. 20, 2016, now Pat. No. 10,400,687.

(51) Int. Cl.
    *C25B 1/04*     (2021.01)
    *C25B 15/02*     (2021.01)
    *C25B 15/08*     (2006.01)
    *F02D 19/06*     (2006.01)
    *C25B 15/027*     (2021.01)
    *F02D 41/28*     (2006.01)
    *F02D 41/14*     (2006.01)

(52) U.S. Cl.
    CPC .......... *C25B 15/08* (2013.01); *F02D 19/0671* (2013.01); *F02M 25/12* (2013.01); *F02D 41/28* (2013.01); *F02D 2041/1412* (2013.01); *F02D 2200/04* (2013.01); *F02D 2200/101* (2013.01); *F02D 2200/1002* (2013.01); *F02D 2200/701* (2013.01); *Y02E 60/36* (2013.01); *Y02T 10/30* (2013.01)

(58) Field of Classification Search
    CPC ....... F02D 2200/1002; F02D 2200/101; F02D 2200/701; C25B 1/04; C25B 15/02; C25B 15/027; C25B 15/08; Y02E 60/36; Y02T 10/30; F02M 25/12

See application file for complete search history.

(56) References Cited

U.S. PATENT DOCUMENTS

| | | | |
|---|---|---|---|
| 3,862,624 A | 1/1975 | Underwood | |
| 4,028,208 A | 6/1977 | Giacopelli | |
| 4,111,160 A | 9/1978 | Talenti | |
| 4,112,875 A | 9/1978 | Laumann et al. | |
| 4,369,737 A | 1/1983 | Sanders et al. | |
| 4,392,937 A | 7/1983 | Schmitt et al. | |
| 4,403,645 A | 9/1983 | MacCracken | |
| 4,442,801 A | 4/1984 | Glynn et al. | |
| 4,784,700 A | 11/1988 | Stern et al. | |
| 5,105,773 A | 4/1992 | Cunningham et al. | |
| 5,450,822 A | 9/1995 | Cunningham | |
| 6,332,434 B1* | 12/2001 | De Souza ............. | H01M 50/54 123/3 |
| 7,398,644 B2 | 7/2008 | Leone et al. | |
| 7,819,091 B2 | 10/2010 | Sego | |
| 7,832,197 B2 | 11/2010 | Leone | |
| 7,861,520 B2 | 1/2011 | Broderick et al. | |
| 8,186,315 B2 | 5/2012 | Jeffs et al. | |
| 8,691,070 B1 | 4/2014 | Burkett et al. | |
| 9,695,760 B2* | 7/2017 | Dufford ............... | B60W 10/06 |
| 9,732,646 B2* | 8/2017 | Upadhyay ............. | F01N 3/0232 |
| 10,253,685 B2 | 4/2019 | Alexander et al. | |
| 11,268,458 B2* | 3/2022 | Bridge ..................... | C25B 1/04 |
| 2001/0003276 A1 | 6/2001 | De Souza et al. | |
| 2003/0024489 A1 | 2/2003 | Balan et al. | |
| 2006/0090712 A1 | 5/2006 | Ehresman | |
| 2006/0180101 A1 | 8/2006 | Monette | |
| 2007/0042244 A1 | 2/2007 | Spallone et al. | |
| 2008/0017137 A1 | 1/2008 | VanHoose et al. | |
| 2008/0302670 A1 | 12/2008 | Boyle | |
| 2010/0175941 A1 | 7/2010 | Khodabakhsh | |
| 2010/0183931 A1 | 7/2010 | Hedman | |
| 2011/0086280 A1 | 4/2011 | Roustaei | |
| 2011/0094456 A1 | 4/2011 | Dee | |
| 2011/0174241 A1 | 7/2011 | McConahay et al. | |
| 2011/0185990 A1 | 8/2011 | Inwald | |
| 2011/0203917 A1 | 8/2011 | Shmueli et al. | |
| 2011/0253070 A1 | 10/2011 | Haring | |
| 2011/0303194 A1 | 12/2011 | Fong et al. | |
| 2012/0111734 A1 | 5/2012 | Kramer | |
| 2012/0298054 A1 | 11/2012 | Dinsmore | |
| 2013/0037003 A1 | 2/2013 | Sheerin | |
| 2013/0071317 A1* | 3/2013 | Lee .......... | F02B 43/10 123/3 |
| 2013/0127245 A1 | 5/2013 | Kruger | |
| 2013/0174797 A1* | 7/2013 | Owens ...... | C25B 9/73 123/3 |
| 2014/0261303 A1* | 9/2014 | McAlister ...... | F02D 19/08 123/297 |
| 2014/0262819 A1 | 9/2014 | Forbes et al. | |
| 2014/0290595 A1 | 10/2014 | Owens | |
| 2015/0040844 A1 | 2/2015 | Goldman et al. | |
| 2015/0101926 A1 | 4/2015 | Burns | |
| 2015/0275787 A1* | 10/2015 | Dufford ............ | B60W 10/08 701/112 |
| 2016/0201533 A1* | 7/2016 | Upadhyay ............ | F01N 9/002 60/274 |
| 2016/0369688 A1 | 12/2016 | Hamad et al. | |
| 2017/0298811 A1* | 10/2017 | Santillo .............. | F02B 37/12 |
| 2018/0112608 A1* | 4/2018 | Bridge ................ | C25B 1/04 |

FOREIGN PATENT DOCUMENTS

| | | |
|---|---|---|
| CA | 2412367 A1 | 5/2004 |
| CA | 2449538 A1 | 5/2005 |
| CA | 2546166 A1 | 5/2005 |
| CN | 101255832 A | 9/2008 |
| CN | 101975108 A | 2/2011 |
| DE | 102011000655 A1 | 8/2011 |
| GB | 1263881 A | 2/1972 |
| GB | 2073317 A | 10/1981 |
| GB | 2461375 A | 1/2010 |
| GB | 2479404 A | 10/2011 |
| JP | 2007-085203 A | 4/2007 |
| RU | 2446294 C2 | 3/2012 |
| WO | 2007130571 A2 | 11/2007 |
| WO | 2008154721 A1 | 12/2008 |
| WO | 2011027309 A2 | 3/2011 |
| WO | 2011031763 A1 | 3/2011 |
| WO | 2011124921 A1 | 10/2011 |
| WO | 2011127583 A1 | 10/2011 |
| WO | 2013138915 A1 | 9/2013 |
| WO | 2014110295 A2 | 7/2014 |
| WO | 2016064289 A1 | 4/2016 |

OTHER PUBLICATIONS

International Search Report and Written Opinion dated Dec. 11, 2017 in International Patent Application No. PCT/CA2017/051145 (7 pages).

International Search Report and Written Opinion dated Dec. 17, 2013 in International Patent Application No. PCT/CA2013/000737 (8 pages).

International Preliminary Report on Patentability dated Feb. 24, 2015 in International Patent Application No. PCT/CA2013/000737 (6 pages).

International Search Report and Written Opinion dated Jul. 8, 2011 in International Patent Application No. PCT/CA2011/000421 (9 pages).

International Preliminary Report on Patentability dated Oct. 16, 2012 in International Patent Application No. PCT/CA2011/000421 (6 pages).

Restriction Requirement dated Nov. 10, 2014 in U.S. Appl. No. 13/641,005 (6 pages).

Search Report dated Jun. 17, 2014 in CN Patent Application No. 201180023927.1 (1 page—English translated).

(56) References Cited

OTHER PUBLICATIONS

First Office Action dated Jun. 27, 2014 in CN Patent Application No. 201180023927. 1 (18 pages with English translation).
International Search Report and Written Opinion dated Jul. 10, 2013 in International Patent Application No. PCT/CA2013/000273 (8 pages).
International Preliminary Report on Patentability dated Sep. 23, 2014 in International Patent Application No. PCT/CA2013/000273 (5 pages).
Final Office Action and Notice of References Cited dated Nov. 25, 2016 in U.S. Appl. No. 14/423,602 (15 pages).
Non-final Office Action and Notice of References Cited dated May 30, 2018 in U.S. Appl. No. 15/298,783 (22 pages).
Notice of Allowance and Notice of References Cited dated May 2, 2019 in U.S. Appl. No. 15/298,783 (9 pages).
Extended European Search Report dated Apr. 28, 2020 in EP Patent Application No. 17862395.5 (9 pages).
Office Action and Search Report dated Jul. 23, 2020 in RU Patent Application No. 2019114033 (28 pages with English translation).

\* cited by examiner

MANAGEMENT SYSTEM AND METHOD FOR REGULATING THE ON-DEMAND ELECTROLYTIC PRODUCTION OF HYDROGEN AND OXYGEN GAS FOR INJECTION INTO A COMBUSTION ENGINE

CROSS-REFERENCE TO RELATED APPLICATIONS

This application is a continuation of U.S. patent application Ser. No. 17/184,005, filed Feb. 24, 2021, which is a continuation of U.S. patent application Ser. No. 16/514,543 filed on Jul. 17, 2019, now U.S. Pat. No. 10,961,926 issued on Mar. 30, 2021, which is a continuation of U.S. patent application Ser. No. 15/298,783 filed on Oct. 20, 2016, now U.S. Pat. No. 10,400,687 issued on Sep. 3, 2019, the entire contents of which are hereby incorporated by reference.

FIELD

The embodiments described herein relate to a system and method for managing an on-demand electrolytic reactor for supplying hydrogen and oxygen gas to an internal combustion engine. In particular, the embodiments relate to a management system and method that can simultaneously reduce emissions and improve the performance of an internal combustion engine by: determining the reactor performance level or calculating the amount of gas being generated by the on-demand electrolytic reactor; monitoring the engine performance level, determining whether the engine performance level would change, i.e. decrease or increase, or remain the same to forecast a future engine demand level; adjusting the reactor performance level to improve the engine performance ahead of the forecast future engine demand level materializing to minimize parasitic loss associated with reactors operating continuously, i.e. reactors that are not capable of adjusting their performance level or the level of produced gas according to the real time engine performance level; and, thereby, improving the engine performance and reducing emissions.

INTRODUCTION

It has been shown in the art that addition of hydrogen and/or oxygen to the pre-combustion mixture improves the combustion efficiency of internal combustion engines. The improved combustion efficiency may result in lowering emissions and/or improving fuel economy. To achieve this result, an electrolytic reactor is responsible to generate hydrogen and oxygen using water. In order to operate, the reactor requires a power source. In case of an add-on reactor that is installed within a vehicle, the power source is the vehicle's engine. In absence of a proper management and control system, the reactor operates continuously. The uninterrupted supply of hydrogen and oxygen to the engine may not always result in reduced emissions or improved fuel economy. External conditions, such as level of oxygen in the surrounding air, temperature, altitude, humidity, road surface and its grade, etc., can make the operation of the reactor unnecessary.

Accordingly, if the reactor functions ceaselessly without control to supply gas, the engine performance may not be improved. The reactor is drawing power from the engine to keep generating gas. As a result, the power produced by the engine is not consumed entirely for the propulsion and vehicle's internal demands, such as recharging the vehicle's battery or illuminating the road using its lighting system. It is well known that addition of a reactor introduces an external demand or load on the engine. If the reactor works continuously without control, the power drawn from the engine for the reactor's operation may become a parasitic loss to the engine. As a result, emissions may be reduced without improving the fuel efficiency. There are numerous prior arts addressing addition of an electrolytic reactor to improve emissions, as discussed below. However, none of the references discusses a management and control system that can reduce parasitic engine loss associated with these reactors to thereby improve the engine performance and fuel economy and reduce emissions, simultaneously.

De Souza et al. in U.S. Pat. No. 6,332,434 disclose a system and process for generating hydrogen for use in an internal combustion engine. De Souza teaches monitoring specific engine parameters and adjusting the rate of reaction by regulating the amount of provided electrical energy. In De Souza, the operation of the hydrogen generating system may be monitored through sensors and corrected when operating outside normal conditions. However, the normal conditions, the control and the monitoring in De Souza are for safety features and not for improving the performance of the engine. Further, the system in De Souza does not utilize sensors to calculate the amount of the gas being generated. The amount of the gas produced by the reactor correlates with the power consumed by the reactor to generate the gas. As a result, the system in De Souza cannot monitor the engine's energy loss associated with operation of the reactor and cannot minimize the loss. In other words, De Souza may be able to improve fuel efficiency but it will never minimize the impact of the reactor because the system taught by De Souza does not minimize the reactor's power consumption.

Fong et al. in US20110303194 disclose systems and methods for improving combustion and engine performance through controlled oxyhydrogen injection. This prior art discloses reading combustion parameters from the engine control module and modifying hydrogen production by controlling the supplied electrical current. However, Fong et al. do not appear to teach determining the amount of gas generated by the reactor.

Dee et al. in US20110094459 disclose systems and methods for managing the operation of a modified engine with hydrogen and oxygen injection. Dee teaches dynamically generating hydrogen and oxygen based on engine operating characteristics by managing the supplied electrical current. Similar to other prior arts cited above, the system as taught by Dee et al does not determine the amount of gas generated by the reactor so as to adjust the reactor operating condition to reduce parasitic engine's energy loss and improve the engine's efficiency.

As it is evident from the above discussion of prior arts, there is currently a need for a managing system that can control on-demand generation of hydrogen and oxygen by an electrolytic reactor to reduce emissions and improve fuel economy and engine performance simultaneously. The inventors' solution is to measure the reactor performance level by monitoring a plurality of reactor parameters through a plurality of sensors, thereby calculating the amount of gas being generated, determining the real time engine performance level by monitoring a plurality of engine parameters, determining a change in the engine performance level to forecast, ahead of time, a future engine demand level, and adjusting the reactor performance level to produce gas in an amount that can improve the engine performance prior to the forecast future engine demand level taking place. Monitoring the engine performance in real time can be used to predict the future engine demand level; this, in combination with knowing and controlling the reactor's gas production rate, will provide the means to produce and deliver the gas in real time in an amount that will improve the engine performance while the engine is operating either at the determined engine performance level or at the forecast future engine demand level. In other words, the reactor does not show a reactionary response to what has already happened. The reactor is always one step ahead and ready to supply the engine with the amount of gas required at any instant.

SUMMARY

The embodiments described herein provide in one aspect a system for managing an on-demand electrolytic reactor for supplying hydrogen and oxygen gas to an internal combustion engine. The system minimizes amount of power drawn from the engine for the reactor to operate and thereby the system minimizes parasitic energy loss generally associated with perpetual reactors. The engine measures and stores a plurality of engine parameters. The system comprises an electronic control unit ("ECU") connected to a plurality of sensors coupled to the reactor that are configured to measure a plurality of reactor parameters and a reactor control board ("RCB") coupled to the reactor. The electronic control unit ("ECU") is configured to monitor the plurality of reactor parameters and the plurality of engine parameters; determine a reactor performance level based on at least one of the plurality of reactor parameters; determine an engine performance level based on at least one of the plurality of engine parameters; determine a change in the engine performance level to forecast a future engine demand level; and determine an ideal reactor performance level corresponding to the determined engine performance level, or, if a change in the engine performance level was determined, to the forecast future engine demand level. The reactor control board ("RCB") is configured to regulate the reactor in response to the ideal reactor performance level determined by the electronic control unit ("ECU") by modifying at least one of electrical current supplied to the reactor, electrical voltage supplied to the reactor, and temperature of the reactor.

The embodiments described herein provide in another aspect a similar system in which the ECU is further configured to recalibrate the plurality of engine parameters stored in the engine based on at least one of the plurality of reactor parameters.

In another aspect, the ECU of the same system is further configured to detect an occurrence of at least one of the plurality of reactor parameters existing outside a normal operating range and the ECU is further configured to regulate the reactor in response to the occurrence.

In yet another aspect, the plurality of reactor parameters monitored by the ECU comprises at least one of the following: water tank level, electrolyte level, supplied electrical voltage, supplied electrical current, water tank temperature, reactor temperature, reactor leakage, water pump, gas flow, relative humidity, conductivity of electrolyte, resistance of electrolyte, and concentration of electrolyte.

In the other aspect, the plurality of engine parameters comprises at least one of: odometer, engine speed, fuel consumption, fuel rate, mass air pressure, mass air flow, mileage, distance, fuel rate, exhaust temperature, $NO_x$ levels, $CO_2$ levels, $O_2$ levels, engine instantaneous fuel economy, engine average fuel economy, engine inlet air mass flow rate, engine demand percent torque, engine percent load at current speed, transmission actual gear ratio, transmission current gear, engine cylinder combustion status, engine cylinder knock level, and after treatment intake $NO_x$ level preliminary FMI, drivetrain, vehicle speed and GPS location.

In one more aspect, the system further comprises a storage module coupled to the electronic control unit, the storage module configured to store the plurality of reactor parameters, the plurality of engine parameters, the reactor performance level, and the engine performance level.

In yet one more aspect, the system further comprises a display module coupled to the electronic control unit, the display module configured to visually display a performance indicator based on at least one of: at least one of the plurality of reactor parameters, at least one of the plurality of engine parameters, the reactor performance level, and the engine performance level.

In another aspect, the system further comprises a communication module coupled to the ECU. The communication module is configured to transmit a first plurality of data to a remote server and receive a second plurality of data from the remote server. The first plurality of data comprises the plurality of reactor parameters, the plurality of engine parameters, the reactor performance level, and the engine performance level. The second plurality of data comprises the ideal reactor performance level and instructions to the reactor control board for achieving the ideal reactor performance level. The second plurality of data is generated based on at least one of historical trends of the transmitted first plurality of data and comparison to other first plurality of data transmitted from other ECUs in communication with the remote server.

In yet another aspect, if the engine is not equipped with an engine control module and the electronic control unit cannot monitor the plurality of engine parameters, the electronic control unit communicates with the remote server to find similar engine conditions to determine the ideal reactor performance level.

In yet another aspect, if the engine is equipped with an engine control module, but the electronic control unit is unable to establish a connection with the engine control module, the electronic control unit can communicate with the remote server to find similar engine conditions to determine the ideal reactor performance level.

In yet another aspect, the system determines the ideal reactor performance level further based on optimizing at least one of engine performance indicators according to their priorities. The engine performance indicators comprise the following: fuel efficiency, emissions, engine torque, and engine horsepower.

The embodiments described herein provide in another aspect a method for managing an on-demand electrolytic reactor for supplying hydrogen and oxygen gas to an internal combustion engine. The method minimizes amount of power drawn from the engine for the reactor to operate. The method minimizes parasitic energy loss generally associated with perpetual reactors. The reactor and engine are in communication with an electronic control unit. The engine measures and stores a plurality of engine parameters. The method comprises providing a plurality of sensors coupled to the reactor that are configured to measure a plurality of reactor parameters, monitoring the plurality of reactor parameters, monitoring the plurality of engine parameters, determining a reactor performance level based on at least one of the plurality of reactor parameters, determining an engine performance level based at least on one of the plurality of engine parameters, determining a change in the engine performance level to forecast a future engine demand level, determining an ideal reactor performance level corresponding to the determined engine performance level, or, if a change in the engine performance level was determined, to the forecast future engine demand level, and regulating the reactor in response to the determined ideal reactor performance level by modifying at least one of electrical current supplied to the reactor, electrical voltage supplied to the reactor, and temperature of the reactor.

In yet another aspect, the method further comprises recalibrating the plurality of engine parameters based on at least one of the plurality of reactor parameters.

In another aspect, the method further comprises detecting an occurrence of at least one of the plurality of reactor parameters existing outside a normal operating range and regulating the reactor in response to the occurrence.

In one more aspect, the plurality of reactor parameters comprises at least one of water tank level, electrolyte level, supplied electrical voltage, supplied electrical current, water tank temperature, reactor temperature, reactor leakage, water pump, gas flow, relative humidity, conductivity of electrolyte, resistivity of electrolyte, and concentration of electrolyte.

In another aspect, the plurality of engine parameters comprises at least one of odometer, engine speed, fuel consumption, fuel rate, mass air pressure, mass air flow, mileage, distance, fuel rate, exhaust temperature, $NO_x$ levels, $CO_2$ levels, $O_2$ levels, engine instantaneous fuel economy, engine average fuel economy, engine inlet air mass flow rate, engine demand percent torque, engine percent load at current speed, transmission actual gear ratio, transmission current gear, engine cylinder combustion status, engine cylinder knock level, and after treatment intake $NO_x$ level preliminary FMI, drivetrain, vehicle speed, and GPS location.

In yet another aspect, the method further comprises storing the plurality of reactor parameters, the plurality of engine parameters, the reactor performance level, and the engine performance level.

In one more aspect, the method further comprises visually displaying at least a performance indicator based on at least one of at least one of the plurality of reactor parameters, at least one of the plurality of engine parameters, the reactor performance level, and the engine performance level.

In another aspect, the method further comprises transmitting a first plurality of data to a remote server and receiving a second plurality of data from the remote server. The first plurality of data comprises the plurality of reactor parameters, the plurality of engine parameters, the reactor performance level, and the engine performance level. The second plurality of data comprises the ideal reactor performance level and instructions to the electronic control unit for achieving the ideal reactor performance level. The second plurality of data is generated based on at least one of historical trends of the transmitted first plurality of data and comparison to other first plurality of data transmitted from other engines to the remote server.

In yet another aspect, the ideal reactor performance level is determined further based on optimizing at least one of engine performance indicators, wherein the engine performance indicators comprise fuel efficiency, emissions, engine torque, and engine horsepower. The method further comprises prioritizing each of the engine performance indicators, determining the ideal reactor performance level required to optimize each of the engine performance indicators ranked from highest to lowest and optimizing the reactor performance to achieve an improved engine performance based on aggregate of the determined idea reactor performance levels.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
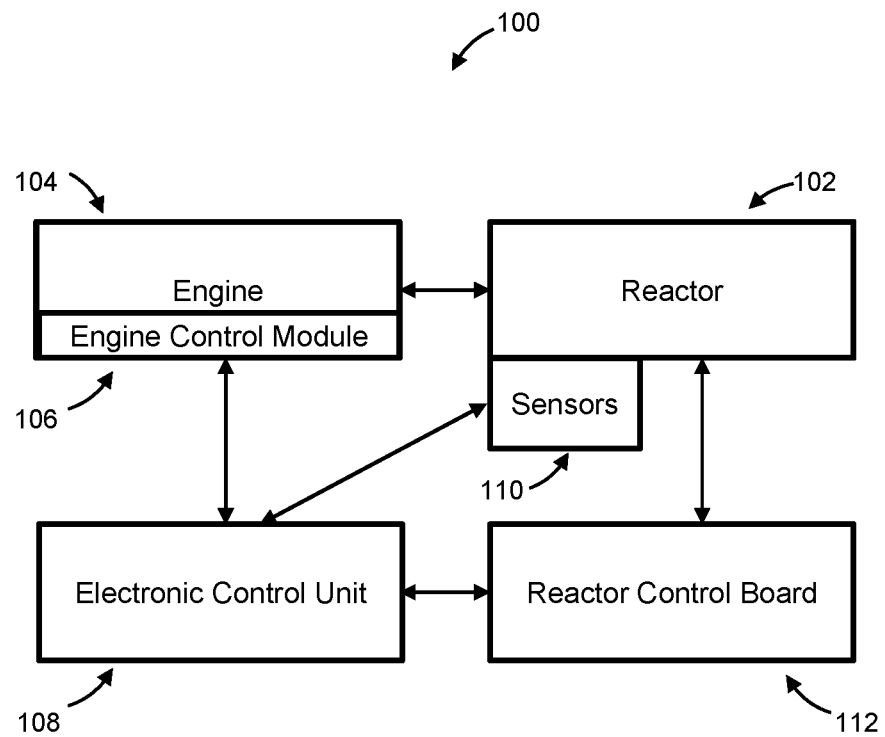
FIG. 1 is a block diagram of interactions between various components, such as engine, electronic control module ("ECM"), electronic control unit ("ECU"), reactor and reactor control board ("RCB") of the system of managing the electrolytic reaction for generating hydrogen gas to be injected to an internal combustion engine.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

One or more systems described herein may be implemented in computer programs executing on programmable computers, each comprising at least one data processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

Referring now to FIG. 1, FIG. 1 is a block diagram illustrating an exemplary embodiment of system 100 that manages electrolytic reaction of an on-demand reactor 102 for generating hydrogen and oxygen gas to be injected into an internal combustion engine 104 so as to reduce emissions, improve fuel economy and improve engine performance. System 100 comprises a number of functional elements including a reactor 102, an engine 104, an engine control module ("ECM") 106, an electronic control unit ("ECU") 108, a plurality of sensors 110 coupled to the reactor 102, and a reactor control board ("RCB") 112. The ECU 108 is the commander or decision-making unit of the system 100. The ECU 108 together with the RCB 112 form the control set (not shown) of the system 100. Upon starting the engine 104, the ECU 108 powers on and receives power from the engine's ignition signal. This signal is provided when the ignition is turned on.

After the power-on stage, the system 100 performs a self-check. The self-check is a built-in function of the ECU 108's micro-controller (not shown) that performs initialization of the ECU 108's input and output pins as well as initialization of the RCB 112 and the plurality of sensors 110. The system 100 then moves on to perform self-monitoring and operation steps.

In the first step of self-monitoring steps, the ECU 108 performs a leak check on the reactor 102. A subroutine is used to detect a leak and prevent a false positive. If a leak is detected, the subroutine returns a value indicating so, and generates a fault code.

Next, the ECU 108 performs a temperature check on the reactor 102. A subroutine is used to monitor the reactor 102's temperature and control the reactor 102's heater (not shown) to an optimal temperature for the reactor 102.

Next, the ECU 108 performs a temperature check on the water reservoir (not shown). A subroutine is used to monitor the water reservoir temperature and control the water reservoir heater to an optimal temperature for the water.

Next, the ECU 108 performs the reactor 102 voltage check. A subroutine is used to check that the voltage is in the optimal range. The RCB 112 has built-in circuitry to measure and control the voltage. The ECU 108 records the value and compares it with the optimal range. If the ECU 108 determines that the voltage is not within, and cannot be adjusted to, the optimal range, it returns a fault code.

Next, the ECU 108 performs a level check of the water reservoir. A subroutine is used to measure the water reservoir level (not shown) connected to the reactor 102. The subroutine has 2 levels. If the ECU 108 receives an "add water" signal for the first level associated with the "operator fill" level, it returns a warning to the operator to top up the tank (not shown). If the ECU 108 receives a signal for the second level associated with the pump (not shown), the ECU 108 will not allow the pump to turn on, preventing damage to the pump and system 100. The ECU 108 will eventually shut the reactor 102 off to prevent further damage in the event that no water is added to the reservoir.

Next, the ECU performs a resistance check on the reactor 102. A subroutine is used to measure the resistance of the electrolyte. A sensor among the plurality of sensors 110, in contact with the electrolyte, is used to measure the resistance. The value can be used to determine the concentration and conductivity of the electrolyte. This information may be useful in the high precision gas flow calculation, discussed below.

After the self-monitoring steps, described above, the system 100 moves on to perform operation steps. The first step is to power up the reactor 102.

The ECU 108 will determine if the reactor 102 can be powered up based on the status of the self-monitored checks, above. If the ECU 108 powers on the reactor 102 and no water is added to the reactor 102, the ECU 108 will shut the reactor 102 down when it reaches a low electrolyte state. When the ECU 108 determines that the reactor 102 is ready, it then turns on the reactor 102. To do so, the ECU 108 sends a signal to the RCB 112 allowing the current to flow through the reactor 102.

Then, the ECU 108 performs a reactor 102 amperage check; this is part of the self-monitoring subroutine. The subroutine is used to measure the amperage that the reactor 102 is drawing. The RCB 112 has built in circuitry to measure and control the amperage to the reactor 102. The measured amperage is an indicator that the reactor 102 is operating. The ECU 108 compares the measured amperage to the optimal amperage and adjusts it accordingly. The RCB 112 can control the voltage and current to adjust the reactor 102's power consumption to optimal performance. The ECU 108 controls the RCB 112 and the reactor 102's temperature for achieving optimal performance.

Similar to other steps, subroutines are programmed in the ECU 108's microcontroller to gather and record plurality of sensors 110 data. The ECU 108 uses the gathered data to measure a plurality of reactor parameters, thereby to calculate the reactor performance level or gas production rate while the reactor 102 is running. To achieve the goal of improving the engine 104's performance, the ECU 108 calculates the performance of the engine 104 (i.e. determines the engine performance indicators and priority, as described in more detail below) by monitoring a plurality of engine parameters to determine how to adjust the reactor performance level (or gas production rate) so as to improve the engine 104's performance. The steps associated with this stage of the managing system 100 are illustrated in FIG. 6 and discussed in more detail below.

Figure 6:
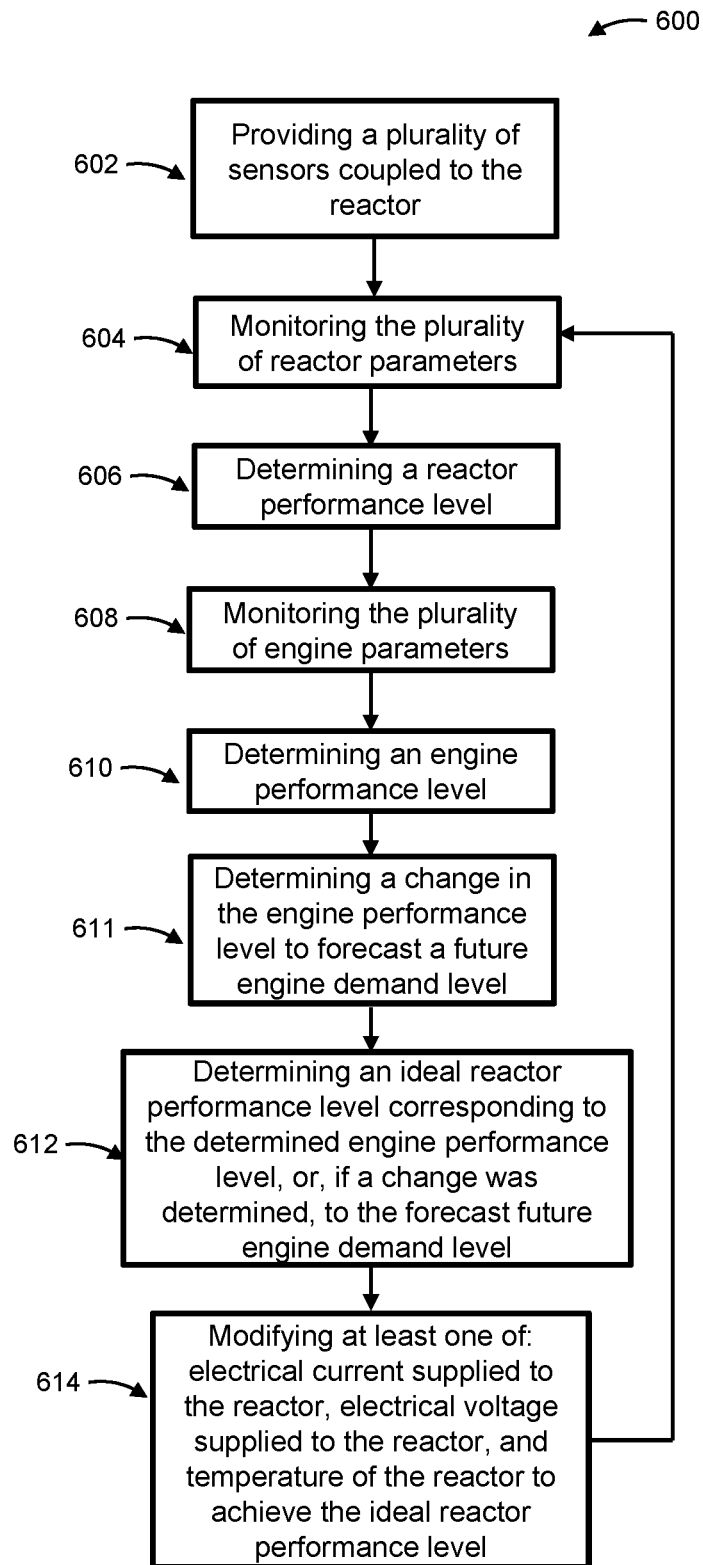
FIG. 6 is a flowchart of the steps performed by the system in managing the electrolytic reaction for generating hydrogen gas to be injected to an internal combustion engine.

Referring now to FIGS. 1 and 6, FIG. 6 is a flowchart that illustrates basic steps 600 taken by the system 100 to improve the engine 104's performance. The process begins at step 602. At step 604, the ECU 108 monitors the plurality of reactor parameters by means of monitoring the plurality of sensors 110, as described below. At step 606, the ECU 108 determines the reactor performance level based on the data gathered from the plurality of sensors 110 in step 604; this is the initial reactor 102 state. At step 608, the ECU 108 monitors the plurality of engine parameters either directly from the engine 104, in the event the engine 104 is not equipped with an ECM 106, or from the data stored within the ECM 106. At step 610, the ECU 108 determines the engine performance level based on the data gathered in step 608; this is the initial engine 104 state, or its baseline performance. At step 611, the ECU 108 determines changes that may occur in the determined engine performance level by continuing to monitor the engine performance level so that it can forecast a future engine demand level. Then, at step 612, the ECU 108 determines a gas production rate or reactor performance level that can improve the engine performance while the engine is operating at the determined engine performance level or, if changes in the performance were detected in step 611, while the engine is operating at the forecast future engine demand level. The reactor performance level or gas production rate at step 612 is called "ideal reactor performance level" as when the reactor 102 operates at this level it can supply an amount of gas corresponding to the determined engine performance level at step 610, or, if changes detected at step 611, corresponding to the forecast future engine demand level, to the engine 104 at exactly the moment the engine 104 is about to operate at the respective performance or demand level. This is the algorithm through which the system 100 improves the engine 104's performance in real time. In other words, the system 100 is always one step ahead of the engine; the system 100 does not show a reactionary response to what already has taken place. Finally, at step 614, the ECU 108 through the RCB 112 modifies at least one of, but not limited to, the electrical current supplied to the reactor 102, the electrical voltage supplied to the reactor 102, and the temperature of the reactor 102 to achieve the ideal reactor performance level.

The steps described above are repeated while the engine 104 is running. In other words, the performance of the reactor 102 is being optimized constantly, by constantly determining a new ideal reactor performance level corresponding to upcoming engine 104's demand, to continuously improve the engine 104's performance while the engine 104 is running. In addition to determining the engine performance level at any moment, the ECU 108 continuously monitors the plurality of engine parameters to determine any change in the engine performance level and to forecast a future engine demand level. In other words, the ECU 108 can predict the demand that is going to be placed on the engine in future. The ECU 108 then optimizes the reactor 102's performance by commanding it to operate at the ideal reactor performance level corresponding to the determined engine performance level, if the engine is still operating at that level, or the forecast future engine demand level, if the engine is about to operate at this level, to improve the engine 104's performance at real time, i.e. not showing a reactionary response.

The initially measured engine performance level is established as a baseline, as discussed above. The ECU 108 then calculates the reactor performance level or gas production rate, as discussed below, for optimizing the reactor 102's performance and data logging the reactor performance level corresponding to the baseline engine performance level. Thereafter, the ECU 108 monitors the plurality of engine parameters to detect changes in the engine performance level, i.e. a sign of change in the engine 104's demand. If the engine 104's demand and the engine performance level change, the ECU 108 controls the reactor 102 via the RCB 112 to adjust the reactor performance level or gas production rate to improve the engine 104's performance. The ECU 108 further forecasts if the changes in the engine performance level or the engine 104's demand are going to continue based on the engine 104's parameters such as throttle positions, etc. This is the forecasting that takes place at step 611.

In addition to reading the plurality of engine parameters to determine a change in the engine 104's demand and the engine performance level, the ECU 108 also uses the telemetry parameters such as GPS data, terrain condition, etc. to better forecast the future engine demand level and the required reactor performance level or gas production rate.

This method allows the ECU 108, in advance, to estimate the required reactor performance level in preparation for forecast changes in the engine 104's demand, i.e. the forecast future engine demand level. In other words, knowing the reactor performance level, the amount of gas being generated, the engine performance level, and the forecast changes provide the necessary information to the ECU 108 to estimate and control the reactor performance level, or gas production rate, as a means for controlling the actual amount of gas being delivered to the engine 104. Using this information, in combination with determining the engine performance level and forecasting the future engine demand level, results in the ability to adjust the reactor performance level or amount of gas production in a way that optimizes the reactor 102's performance ahead of the engine 104's demand. That is, the gas enters the combustion chamber as the change in the engine performance level occurs, i.e. when the engine 104 operates at the forecast future engine demand level, and not afterwards in response to changes.

This also means that the reactor 102 settings are automatically adjusted so that only the necessary power is used to create the required gas. For instance, if only 1 liter of gas is required, the ECU 108 controls the reactor 102 via the RCB 112 to use the minimum power required to produce that amount of gas. As described below, this operation method of system 100 results in improving the engine 104's performance, based on the priority of the performance indicators, while minimizing the reactor 102's power consumption and optimizing the performance of the reactor 102 while simultaneously improving the fuel efficiency and reducing emissions.

The following paragraphs discuss the aforementioned steps in more detail.

Referring again to FIGS. 1 and 6, to calculate the reactor performance level or gas production rate at step 606, the ECU 108 reads values on amperage, voltage, electrolyte conductivity and concentration, and temperature value, i.e. the plurality of reactor and engine parameters, from the plurality of sensors 110 at step 604. Each ECU 108 has an in-house calibration chart programmed into its microcontroller that maps the hydrogen and oxygen production and parameter values. The data gathered from the plurality of sensors 110 at step 604 is used to fine tune the calculation performed at step 606 by comparing the measured values against the baseline values or previous performance levels. This also has the added benefit that the system 100 does not need to be equipped with expensive gas flow meters to determine the gas being delivered to the engine.

To further determine a more accurate reactor performance level or gas production rate, the ECU 108, in addition to using the electrical power consumed by the reactor 102 (Power=Voltage×Electrical Current), can factor in for the variance in temperature and variance in concentration of electrolyte. Initially, the reactor performance level is determined at a calibration temperature. The reactor 102 will inherently heat up on its own and without controlling the power there is a possibility that the reactor 102 will overheat. When the power is limited, the reactor 102's temperature should stabilize. For calibration, the power is limited and the reactor 102 is allowed to stabilize. The gas production and temperature that are measured initially define the reactor 102's baseline for performance, as referred to above. This means the ECU 108 needs to take into account an adjustment for temperature in further calculations of the reactor performance level.

Consequently, the ECU 108 adjusts the reactor performance level or gas production rate, calculated at step 606, by means of taking into account amperage, voltage, temperature, and/or electrolyte concentration. Thereafter, the ECU 108 returns this adjusted value as the reactor performance level or gas production rate.

The calculations at step 606 may be based on one of, but not limited to, the plurality of sensors 110 monitoring the plurality of reactor parameters, depending on the process or calculation.

Before moving on to the next step of determining the engine performance level, step 610, the importance of monitoring the electrolyte concentration and conductivity should be highlighted. As discussed above, the concentration is monitored at step 604 as part of determining the reactor performance level or gas production rate at step 606; the concentration changes during operation and will have a small effect on the gas production. In addition, the monitoring of electrolyte concentration is used to check that the electrolyte is not lost or not crystalized and to confirm that water has been added to the reactor 102 when required. The concentration will vary as the water is converted to gas. If the concentration is out of a predetermined range and the ECU 108 cannot correct the issue by demanding the pump to add water, the ECU 108 indicates a fault and prevents the system 100 from further operation. The electrolyte is a catalyst and should not get used up. Crystallization and electrolyte loss will lead to a unit failure.

As discussed, the ECU 108 also uses monitoring of the electrolyte concentration to determine the reactor performance level (or the amount of gas being generated) at step 606. Gas production calculations based on the power consumption (derived from those plurality of sensors 110 measuring voltage and amperage, through the following formula Power=Voltage×Electrical Current) are more accurate when adjusted by introducing the concentration and conductivity of the electrolyte into the equation. As the water is decomposed into gas, the concentration level will change. This change affects the gas production to a certain degree.

Moving to the next step of determining the engine performance level, step 610, the ECU 108 interacts with the engine 104, or the ECM 106, using built-in circuitry to monitor the plurality of engine parameters at step 608, discussed below. The plurality of engine parameters is monitored in order to observe the engine 104's operation and performance changes. This allows the ECU 108 to determine the ideal reactor performance level required for improving the engine performance. Changes, determined in step 611, in each of the monitored plurality of engine parameters at step 608 indicate whether the engine 104 needs to supply more power or less power, i.e. whether the engine 104's demand or the engine performance level is increasing or decreasing. Determining changes can be used to forecast a future engine demand level. It is also upon determining a change in the engine 104's demand or the engine performance level that the ECU 108, at step 614, controls the RCB 112 to adjust the reactor performance level or gas production rate to improve the engine 104's performance when the engine 104 is in fact operating at the forecast future engine demand level.

The ECU 108 monitors either through the ECM 106, if available, or directly, at least one of, but not limited to, the following non-exhaustive list of the plurality of engine parameters at step 608 to determine the engine performance at step 610 and to determine a changes in the engine performance level to forecast a future engine demand level at step 611: odometer, vehicle speed, engine speed, fuel consumption, fuel rate, mass air pressure, mass air flow, mileage, distance, fuel rate, exhaust temperature, $NO_x$ sensors, $CO_2$ sensors, $O_2$ sensors, engine instantaneous fuel economy, engine average fuel economy, engine inlet air mass flow rate, engine demand-percent torque, engine percent load at current speed, transmission actual gear ratio, transmission current gear, engine cylinder combustion status (all cylinders), engine cylinder knock level (all cylinders), after treatment intake $NO_x$ sensor preliminary FMI (all banks), etc.

As discussed, the ECU 108 controls the amount of gas delivered to the engine 104 intake by determining the engine performance level in order to improve the combustion process. The ECU 108 is also able to recalibrate some of the plurality of engine parameters, not changing the programming, so that the ECM 106 can adapt to addition of the gasses to the combustion chamber. Moreover, as discussed below, it should be noted that the ECU 108 records the reactor performance level and engine performance level for future analysis and improvement of the system 100.

Now that the ECU 108 has determined the engine performance level at step 610, and the forecast future engine demand level at step 611, it needs to control the RCB 112 to adjust the reactor performance level, or gas production rate, to improve the engine 104's performance while the engine 104 is operating at the determined engine performance level or, due to changes determined at step 611, operating at the forecast future engine demand level. The ECU 108 uses the gathered data from steps 604-611 to determine an ideal reactor performance level at step 612 and send the determined ideal reactor performance level to the RCB 112 at step 614. In addition to the data gathered from the engine 104 and the reactor 102, the ECU 108 also uses telemetry parameters such as GPS data, terrain condition, etc. in determining and forecasting the current and future engine 104's demands, corresponding engine performance levels, and the corresponding ideal reactor performance level.

The reactor 102 now needs to operate according to the determined ideal reactor performance level at step 612. The RCB 112 is designed to controls the reactor in order to control and adjust the amount of gas being delivered to the engine. The RCB 112 has a custom built microcontroller controlling, but not limited to, a pulse width modulator (PWM) and a current sensor. It may also have a voltage and/or a frequency modulator along with corresponding sensors. At step 614, the RCB 112 can measure and control the reactor 102's performance through integrated circuitry based on instructions received from the ECU 108. The RCB 112 also has a humidity-temperature sensor and a communication link, discussed below.

At step 604, the RCB 112 monitors the amperage as part of the self-monitoring subroutine. The RCB 112 measures the power that the reactor 102 is drawing and adjusts the amperage using the PWM to meet the power requirements instructed by the ECU 108. The RCB 112 raises or lowers the amperage to control the reactor performance level or gas production rate, as determined by the ECU 108, provided the power is within the limits. The RCB 112 also monitors the reactor 102 temperature, as part of the self-monitoring subroutine, through an integrated temperature sensor. The RCB 112 and the ECU 108 interacts to control the heater and fan to adjust the reactor temperature.

An increased temperature aids in the electrolytic process of water to a certain degree. As the temperature rises, the decomposition potential, the energy required for splitting water into gas, is lowered. The RCB 112 uses this information to raise the temperature if higher reactor performance level or more gas production rate is needed without increasing the amperage. By increasing the temperature rather than the amperage, the power drawn from the engine 104 can be reduced and thereby the engine 104's performance or efficiency is increased, as discussed below. Further, monitoring the temperature prevents the reactor 102 from overheating.

In summary, the ECU 108, in steps 602-614, interacts with the engine 104, or ECM 106, the plurality of sensors 110 and RCB 112 to determine the reactor performance level and engine performance level. The ECU 108 controls the RBC 112 to control the pulse width modulation circuit (not shown) to control the amount of current available to the reactor 102 and thereby to adjust the reactor performance level or gas production rate to improve the engine 104's performance while the engine 104 is operating at the determined engine performance level or forecast future engine demand level. This adjusted reactor performance level is referred to as the ideal reactor performance level.

It should be noted that, as discussed, the ECU 108 is the commander or major decision-making unit of the system 100. In other words, the RCB 112 is a slave to the ECU 108. However, the RCB 112 is equipped with a communication link as well. Through the communication link, the RCB 112 can gather other auxiliary information to provide further control in the event the ECU 108 is not part of the system 100.

Finally, when the reactor 102 is not required to operate anymore, the ECU 108 performs a shut down cycle. Before turning the unit off, the ECU 108 determines the reactor 102 electrolyte level and reservoir water level. If the water level is low, the ECU 108 indicates to the operator to fill the water reservoir. The ECU 108 will fill the reactor provided there is sufficient water in the reservoir. The cycle has a timer to allow the reactor to settle; the electrolyte level will change slightly after operation. The ECU 108 has a shut down cycle that uses an internal battery to power some functions to prepare the system 100 for immediate operation next time it is turned on. The shut down cycle is initiated when there is no longer an ignition signal powering the ECU 108.

As discussed, the reactor performance level or gas production rate is directly related to the power that the reactor 102 draws from the engine 104 to generate gas. Knowing the reactor performance level, the ideal reactor performance level, and the engine performance level, or the forecast future engine demand level, will allow the system 100 to minimize the parasitic power loss from the engine 104. The reactor 102 uses a portion of the power produced by the engine 104 to run. When the amount of gas generated by the reactor 102 is more than the demand to meet the real time engine performance level, the reactor 102 is using more power from the engine 104 than is necessary. This adds to the parasitic energy loss. Since the system 100 can adjust the reactor performance level according to the real time engine performance level, this parasitic loss can be minimized. By controlling and optimizing the reactor 102's performance, when the engine performance level does not demand a higher gas production rate from the reactor 102, the system 100 places less load on the engine 104. In other words, the system 100 achieves one of the objectives of this invention, namely to reduce emissions and improve fuel efficiency simultaneously while minimizing the power consumption of the reactor 102.

Figure 7:
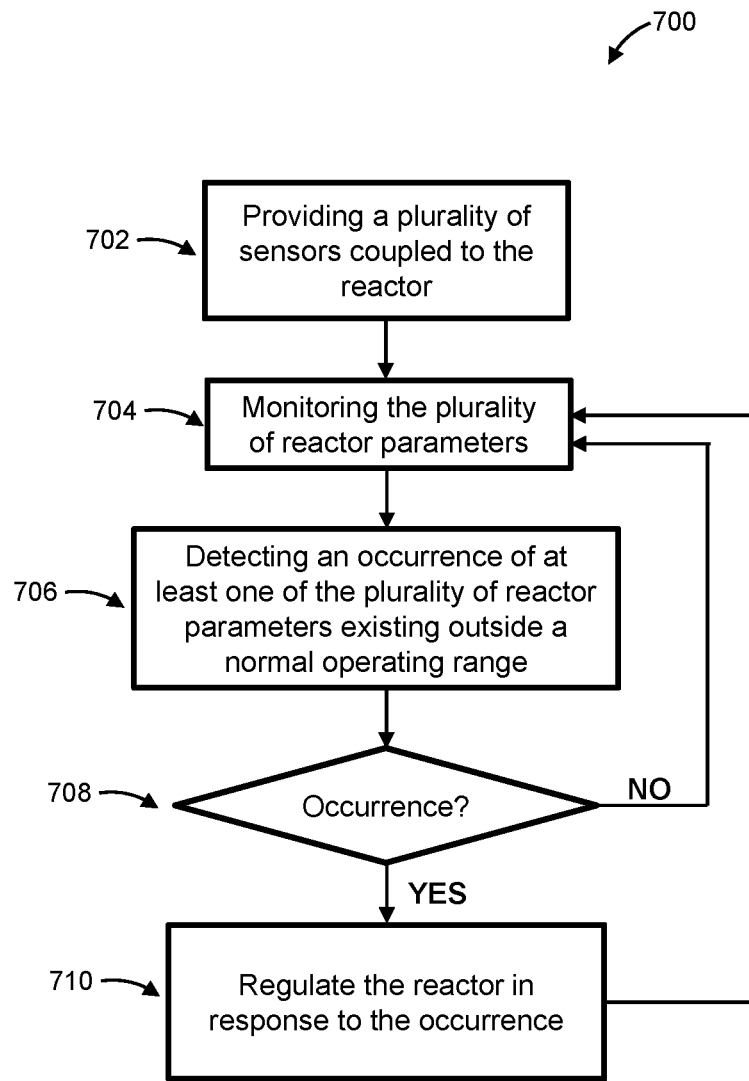
FIG. 7 is a flowchart of the steps performed by the system to detect a fault condition within the reactor and to rectify such condition.

Referring now to FIGS. 1 and 7, FIG. 7 is a flowchart that illustrates basic steps 700 taken by the system 100 to detect faults within the system 100. The process begins at step 702. At step 704, the ECU 108 gathers data on the plurality of reactor parameters by means of monitoring the plurality of sensors 110. At step 706, the ECU 108 checks for an occurrence of at least one of, but not limited to, the plurality of reactor parameters existing outside a normal operating range based on the data gathered from the plurality of sensors 110 in step 704. At step 708, if the ECU 108 determines that at least one of the plurality of reactor parameters is outside a normal operating range, it moves to step 710. Otherwise, it moves back to step 704 to monitor the plurality of reactor parameters again. At step 710, the ECU 108 orders the RCB 112 to regulate the reactor 102 in response to the occurrence detected at step 708.

The ECU 108 has the intelligence to use the information it gathers at step 704 to determine whether the unit is inside the normal operating conditions or not. The ECU 108 has the ability to change operational parameters to correct fault conditions, when needed, at step 710. The ECU 108 has the logic to determine if the changes to correct the fault(s) are having an effect or not. The ECU 108 fault detection is designed to protect the engine 104 from being damaged as well as the system 100 itself. The fault detection is designed in a fail-safe manner. The ECU 108 programming also has built-in corrective actions to be taken to keep the system 100 operational for as long as possible, without causing damage, if a fault occurs. At step 710, the ECU 108 shuts the reactor 102 off if the corrective actions are not having the desired effect to prevent damage to the engine 104 or reactor 102.

The plurality of reactor parameters that are monitored by the ECU 108 at step 704 comprises the following non-exhaustive list: water tank level, electrolyte level, supplied electrical voltage, supplied electrical current, water tank temperature, reactor temperature, reactor leakage, water pump, gas flow, relative humidity, conductivity of electrolyte, resistance of electrolyte, concentration of electrolyte, etc.

At step 704, the ECU 108 monitors the water tank level and provides indication when water needs to be added to the reservoir of the system 100. This also serves to protect the water pump from running when there is not enough water in the tank. The ECU 108 eventually shuts the reactor 102 off at step 710 to prevent further damage in the event that no water is added to the reservoir.

At step 704, the ECU 108 monitors the reactor 102 electrolyte level and will add water to the reactor 102 when needed. The ECU 108 eventually shuts the system 100 off at step 710 in the event that no water is added to the reactor 102.

At step 704, the ECU 108 monitors the electrolyte concentration. The concentration is also monitored as part of determining the reactor performance level or the amount of gas being generated, as discussed above. This monitoring, at step 704, is also used to check that the electrolyte is not crystallizing and to confirm that water has been added to the reactor 102 when required. The concentration will vary as the water is added to the reactor 102 or converted to gas. If the concentration is out of a predetermined range and the ECU 108 cannot correct the issue, the ECU 108 indicates a fault at step 710.

At step 704, the ECU 108 measures the voltage to determine, at step 706, how much voltage is available before the reactor 102 is powered up. It also determines the power the reactor 102 is drawing and ensures the reactor 102 does not drain the vehicle battery in the event that the engine 104's alternator fails or if the ignition is left on without the engine 104 running. If the voltage is outside the working range, the ECU 108 shuts the reactor 102 off and indicates a fault at step 710.

At step 704, the ECU 108 measures the current to determine, at step 706, the power the reactor 102 is drawing and to ensure that the reactor 102 is operating at the specified amperage for the desired reactor performance level or gas production rate. As discussed above, this is one of the ways that the ECU 108 controls the reactor performance level or the gas production rate. If the amperage is outside the working range, the ECU 108 shuts the reactor 102 off and indicates a fault at step 710.

At step 704, the ECU 108 measures the water tank temperature to ensure that the water is liquid and not solid. If, at step 706, the temperature is determined to be below 8° C., the ECU 108 turns on the tank heater to bring the water to operational temperature at step 710.

At step 704, the ECU 108 measures the reactor 102 temperature to monitor its performance and ensure the reactor 102 does not over-heat. At step 706, the ECU 108 determines if the temperature is optimal. The ECU 108 turns on the reactor 102 heater to bring it up to optimal temperature at step 710. It also shuts the reactor 102 down in the event that the reactor 102 starts to overheat.

At step 704, the ECU 108 monitors the reactor 102 for leaks. The ECU 108 at step 706 determines if the leak is a false positive or an actual leak. If the leak is determined to be true the ECU 108 shuts down the reactor 102 and indicates a fault at step 710.

Figure 2:
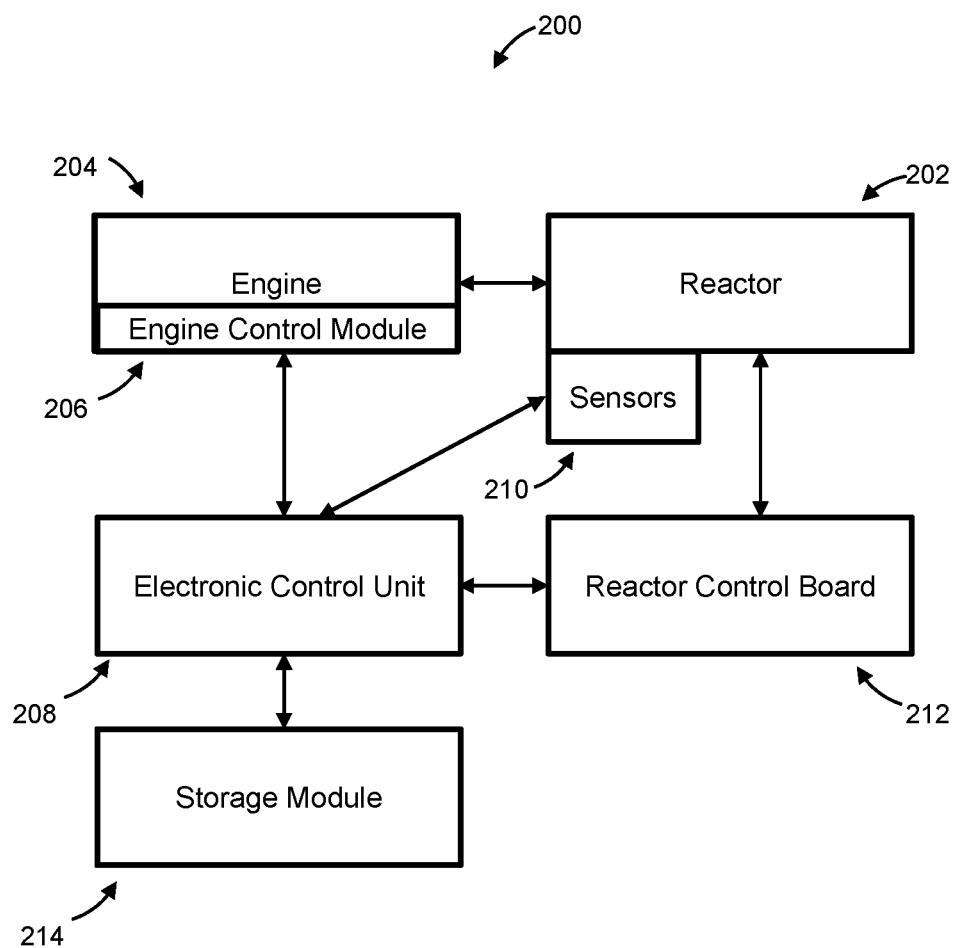
FIG. 2 is a block diagram of the system which further comprises a storage module coupled to the ECU to store reactor parameters, engine parameters, reactor performance level, and engine performance level.

Referring now to FIG. 2, FIG. 2 is a block diagram illustrating another exemplary embodiment of the system 100. System 200 comprises a number of functional elements including a reactor 202, an engine 204, an engine control module ("ECM") 206, an electronic control unit ("ECU") 208, a plurality of sensors 210 coupled to the reactor 202, a reactor control board ("RCB") 212, and a storage module 214 coupled to the ECU 208. Other than the storage module 214, other components are similar to those described above and illustrated in FIG. 1. As a result, these components are referred to using reference numerals corresponding to FIG. 1.

The storage module 214 is configured to store the plurality of reactor parameters, the plurality of engine parameters, the reactor performance level and the engine performance level. The ECU 108 uses the storage module 214 to log and record data for further analysis to create performance improvements. The ECU 108 also logs the data for future reporting.

Figure 8:
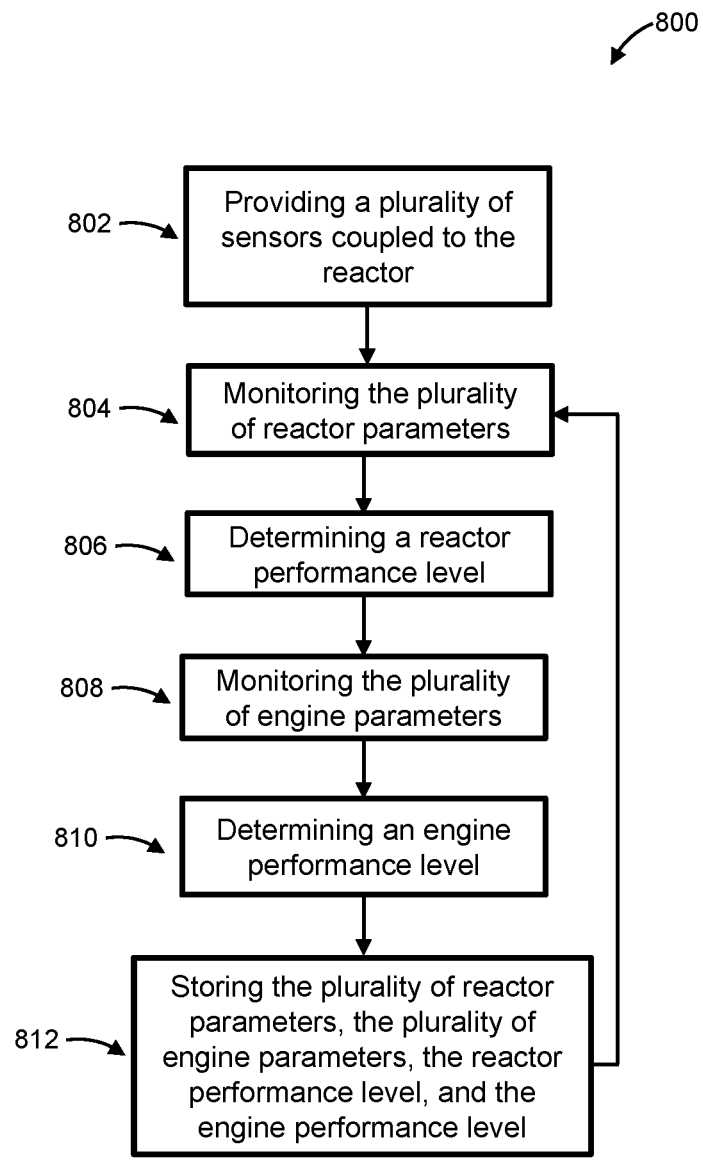
FIG. 8 is a flowchart of the steps performed by the system when it is coupled to a storage module.

Referring now to FIGS. 1, 2 and 8, FIG. 8 is a flowchart that illustrates basic steps 800 taken by the system 100 or 200 to store the plurality of reactor parameters, the plurality of engine parameters, the reactor performance level, and the engine performance level. The process begins at step 802. At step 804, the ECU 108 gathers data on the plurality of reactor parameters by means of monitoring the plurality of sensors 110 or 210. At step 806, the ECU 108 determines the reactor performance level based on the data gathered from the plurality of sensors 110 in step 804. At step 808, the ECU 108 gathers data on the plurality of engine parameters. At step 810, the ECU 108 determines the engine performance level based on the data gathered in step 808. Finally, at step 812, the ECU 108 stores the monitored plurality of reactor parameters and plurality of engine parameters along with the determined reactor performance level and engine performance level in the storage module 214.

Figure 3:
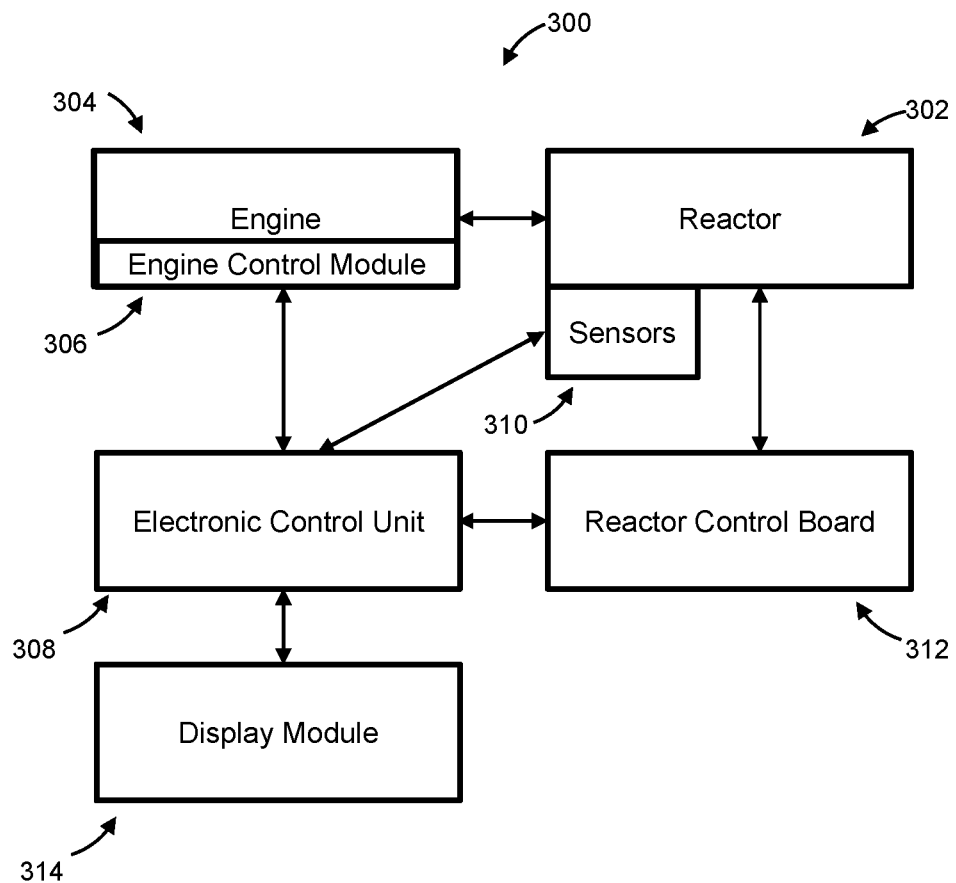
FIG. 3 is a block diagram of the system which further comprises a display module coupled to the ECU to visually display a performance indicator.

Referring now to FIG. 3, FIG. 3 is a block diagram illustrating another exemplary embodiment of system 100. System 300 comprises a number of functional elements including a reactor 302, an engine 304, an engine control module ("ECM") 306, an electronic control unit ("ECU") 308, a plurality of sensors 310 coupled to the reactor 302, a reactor control board ("RCB") 312, and a display module 314 coupled to the ECU 308. Other than the display module 314, other components are similar to those described above and illustrated in FIG. 1. As a result, these components are referred to using reference numerals corresponding to FIG. 1.

Referring to FIGS. 1 and 3, the display module is configured to visually display a performance indicator based on the plurality of reactor parameters, the plurality of engine parameters, the reactor performance level and the engine performance level. The display module 314 is the main focal point for the operator to interface with system 100. The information and communication are controlled by the ECU 108. The display module 314 updates the driver on the performance of the reactor 102 and the engine 104. It also allows the operator to control and setup specific parameters for the reactor 102. Different customers may have different applications for system 100 and the display module 314 provides the interaction for customizing the available parameters to meet their needs. Further, the ECU 108 can communicate with the display module 314 to display the necessary information to a user to keep the system 100 in optimal work order or to inform the user to perform service on the system 100.

Figure 9:
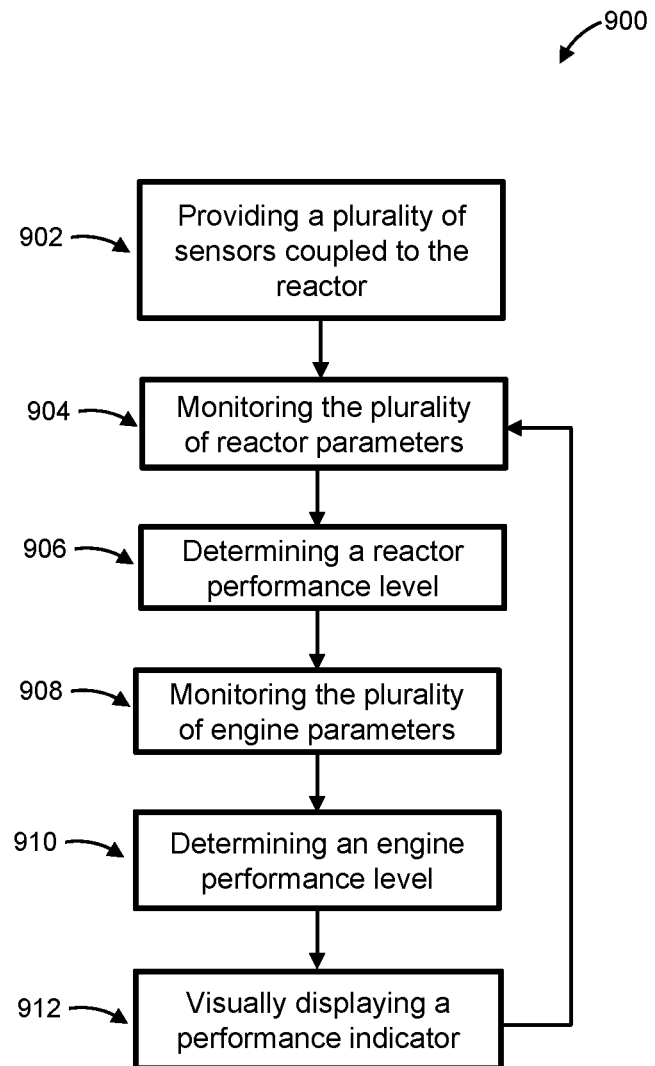
FIG. 9 is a flowchart of the steps performed by the system when it is coupled to a display module.

Referring now to FIGS. 1, 3 and 9, FIG. 9 is a flowchart that illustrates basic steps 900 taken by the system 100 or 300 to visually display the plurality of reactor parameters, the plurality of engine parameters, the reactor performance level, and the engine performance level. The process begins at step 902. At step 904, the ECU 108 gathers data on the plurality of reactor parameters by means of monitoring the plurality of sensors 110 or 310. At step 906, the ECU 108 determines the reactor performance level based on the data gathered from the plurality of sensors 110 in step 904. At step 908, the ECU 108 gathers data on the plurality of engine parameters. At step 910, the ECU 108 determines the engine performance level based on the data gathered in step 908. Finally, at step 912, the ECU 108 can visually display one or many of the monitored plurality of reactor parameters and the plurality of engine parameters along with determined reactor performance level and engine performance level via the display module 314.

Figure 4:
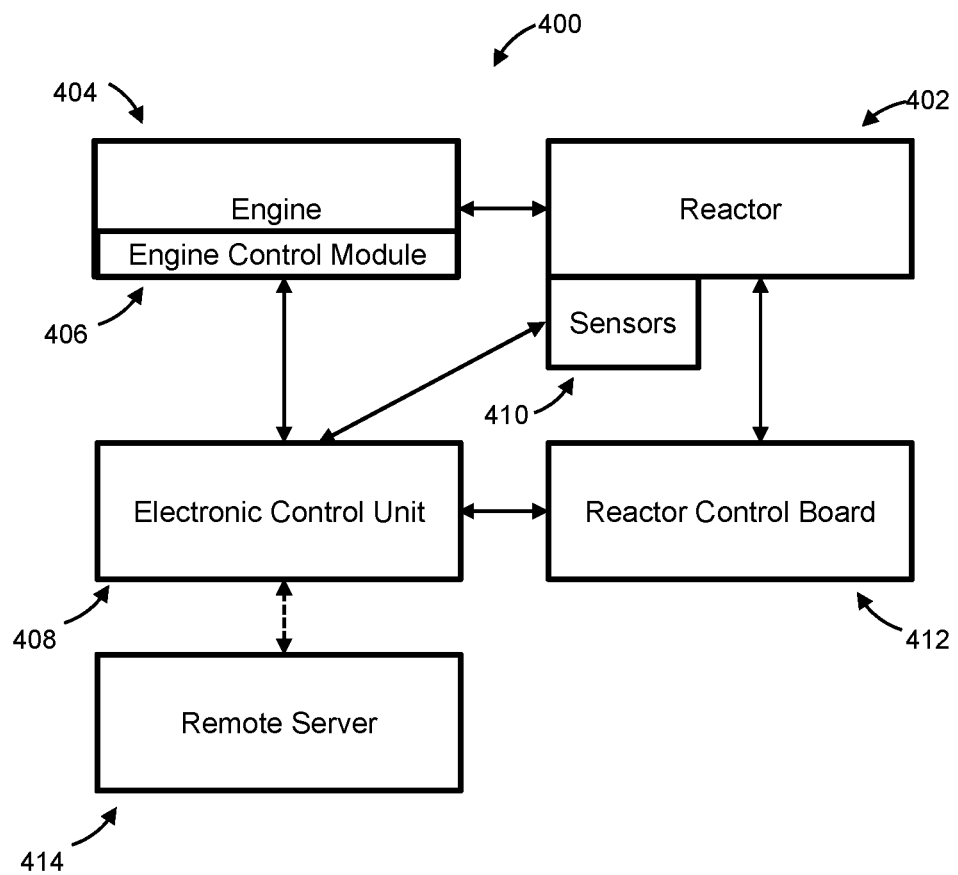
FIG. 4 is a block diagram of the system which further comprises a remote server in communication with the ECU to receive data from the ECU and send data to the ECU.

Referring now to FIG. 4, FIG. 4 is a block diagram illustrating another exemplary embodiment of system 100. System 400 comprises a number of functional elements including a reactor 402, an engine 404, an engine control module ("ECM") 406, an electronic control unit ("ECU") 408, a plurality of sensors 410 coupled to the reactor 402, a reactor control board ("RCB") 412, and a remote server 414 in communication with the ECU 408. Other than the remote server 414, other components are similar to those described above and illustrated in FIG. 1. As a result, these components are referred to using reference numerals corresponding to FIG. 1.

Referring to FIGS. 1 and 4, the ECU 108 is able to transmit performance logs and other specified data to a portal to be compiled and put into a report. The data that is logged and used by the ECU 108 during the initial trip to improve the performance of the engine 104 and optimize the performance of the reactor 102 is uploaded to the remote server 414 at the end of the trip. The received data is analyzed to determine if any improvements can be made to the logic of the system 100 to improve the engine 104's performance. A human operator or a computer program is responsible for conducting said analysis. The improvements may be applied to other ECUs, associated with other engines, in communication with the remote server 414 that have similar conditions. The existence of the remote server 414 is crucial in report generating.

Moreover, the ECU 108 is not limited to transmitting data only at the end of each trip. The ECU 108 can set a data transmission interval during each trip and send data to the remote server 414 accordingly. The received data is stored in the remote server 414 and a trend of historical data is created for every ECU 108 in communication with the remote server 414. Upon receiving the data, an analysis is conducted. The data is compared to historical trends and data received from other ECUs that are in communication with the remote server 414. If the human operator or the computer program determines that an improvement to the performance of the engine 104 and the reactor 102 is available, based on the aforementioned analysis, the remote server 414 sends instructions to the ECU 108 in order to improve the engine 104 and the reactor 102 performance. If the remote server 414 determines that the performance improvement is also applicable to other ECUs associated with other engines in communication with the remote server 414, it sends similar instructions to those ECUs as well.

In order to transmit and receive data to and from the remote server 414, the ECU 108 needs to establish a connection with the remote server 414. The ECU 108 is able to connect through multiple methods to transfer the correct data and information. The ECU 108 has built-in radios, such as GPRS, WIFI, and/or Bluetooth, for communication with external devices for the interaction and transfer of data. The ECU 108 has USB ports too for wired communications. Further, after each instance of data transmission, the ECU 108 receives and sends a confirmation that data has been transmitted successfully.

Figure 10:
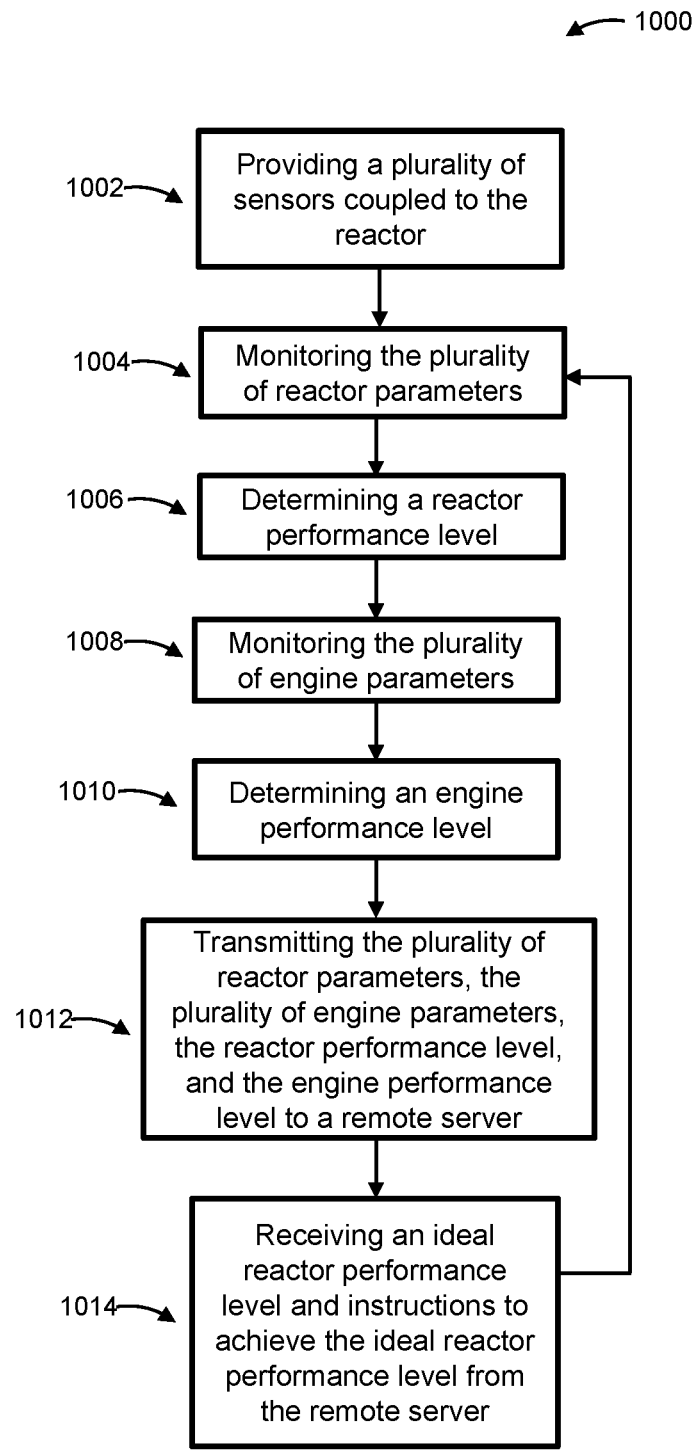
FIG. 10 is a flowchart of the steps performed by the system when it is in communication with a remote server.

Referring now to FIGS. 1, 4 and 10, FIG. 10 is a flowchart that illustrates basic steps 1000 taken by managing system 100 or 400 to communicate with the remote server 414 and transmit the plurality of reactor parameters, the plurality of engine parameters, the reactor performance level, and the engine performance level. The process begins at step 1002. At step 1004, the ECU 108 gathers data on the plurality of reactor parameters by means of monitoring the plurality of sensors 110 or 410. At step 1006, the ECU 108 determines the reactor performance level based on the data gathered from the plurality of sensors 110 in step 1004. At step 1008, the ECU 108 monitors the plurality of engine parameters. At step 1010, the ECU 108 determines the engine performance level based on the data gathered in step 1008. At step 1012, the ECU 108 transmits the monitored plurality of reactor parameters and plurality of engine parameters along with determined reactor performance level and engine performance level to the remote server 414. Finally, at step 1014, the remote server 414, after conducting the above discussed analysis on the received data, transmits an ideal reactor performance level and instructions on how to achieve the ideal reactor performance level to the ECU 108. This in turn results in improved reactor 102's and engine 104's performance.

Figure 5:
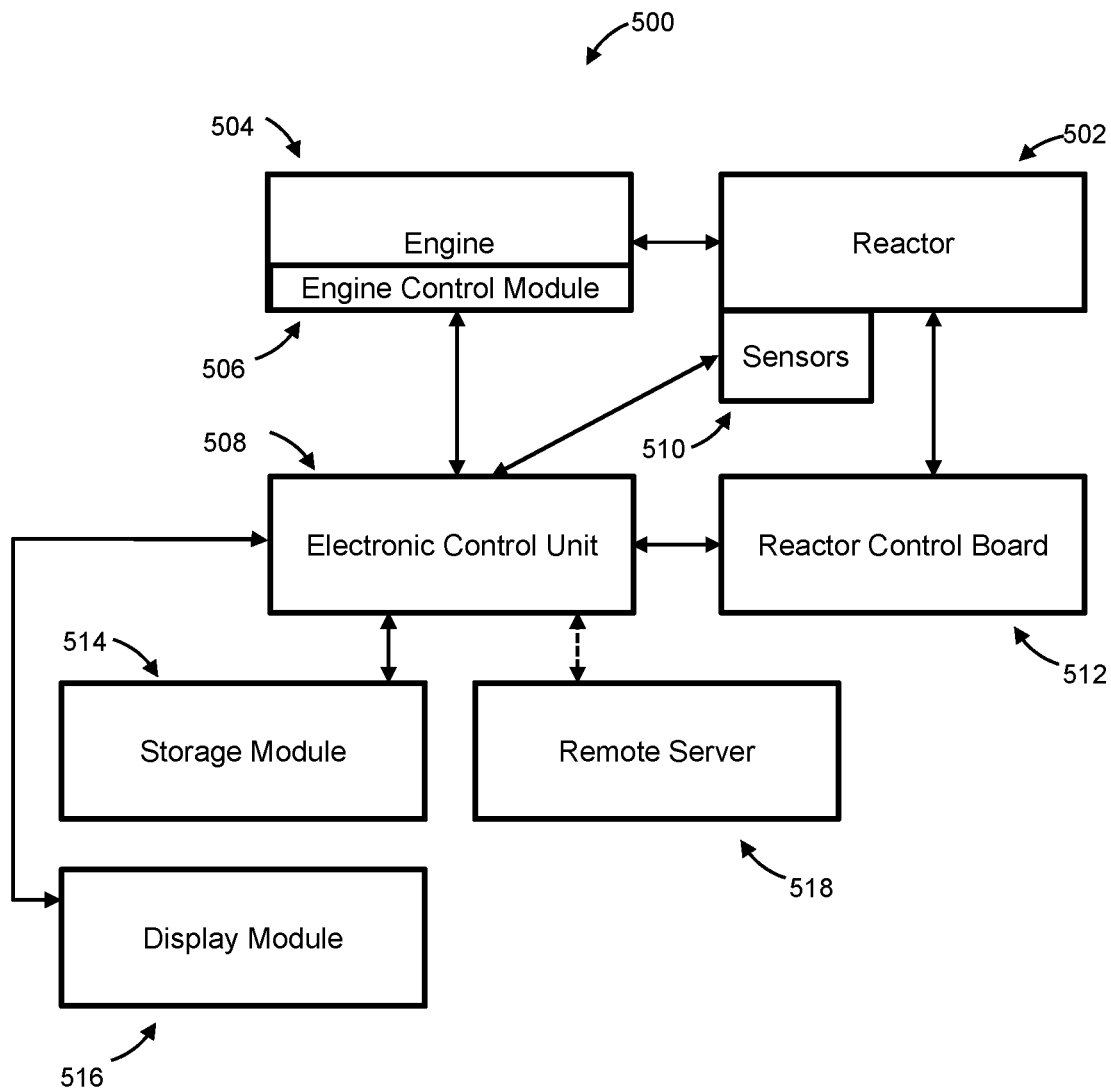
FIG. 5 is a block diagram of the system which further comprises a storage module, display module, and remote server, all in communication with the ECU.

Referring now to FIG. 5, FIG. 5 is a block diagram illustrating another exemplary embodiment of system 100. System 500 comprises a number of functional elements including a reactor 502, an engine 504, an engine control module ("ECM") 506, an electronic control unit ("ECU") 508, a plurality of sensors 510 coupled to the reactor 502, a reactor control board ("RCB") 512, a storage module 514 coupled to the ECU 508, a display module 516 coupled to the ECU 508, and a remote server 518 in communication with the ECU 508. This embodiment is a combination of embodiments represented in FIGS. 1-4.

In another exemplary embodiment of system 100, the ECU 108 can adjust the reactor performance level or gas production rate in a way to selectively optimize engine performance indicators. Engine performance indicators are calculated using the plurality of engine parameters, discussed above. Engine performance indicators are targets that the system 100 wants to achieve. For instance, engine performance indicators are, but not limited to, fuel efficiency, emissions, engine torque, and engine horsepower. Depending on which engine performance indicators are selected, the system 100 maximizes the selected engine performance indicators according to the priority assigned to the selected engine performance indicators.

Referring now to FIGS. 1 and 3, the user selects the engine performance indicators that he/she desires to optimize and ranks them based on a priority that she/he has in mind through the display module 314. The ECU 108 adjust the reactor performance level or gas production rate to optimize each of the selected engine performance indicators ranked from highest to lowest. Consider the following example.

For instance, there are situations where emissions will out rank fuel economy. Consider a case that the engine performance indicators are ordered as: 1) emissions reduction and 2) fuel savings. In this example, the ECU 108 monitors emissions and adjusts the reactor performance level or gas production rate to reduce emissions first. It continues to adjust the reactor performance level or gas production rate to reduce emissions up to the point of reaching a plateau or just before emissions begin to rise again. This is the optimum point. At this point, the ECU 108 focuses on reducing the fuel consumption, the engine performance indicator ranked second in priority. As the fuel consumption is being reduced, emissions are still being monitored to track any changes there. Once the fuel economy is optimized, a comparison between the two different reactor performance levels or gas production rates corresponding to optimizing emissions and fuel economy, respectively, is made to find a best fit model that can optimize efficiency in all aspect of the engine performance. This found best fit model is the ideal reactor performance level associated with simultaneously optimizing selected engine performance indicators. This method for improving the engine 104's and reactor 102's performance can be used with one or multiple engine performance indicators.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. An electronic control unit (ECU) for managing an on-demand electrolytic reactor for supplying hydrogen and oxygen gas to an internal combustion engine, the internal combustion engine being located in a vehicle, the electronic control unit comprising a processor configured to:
monitor a plurality of reactor parameters measured by a plurality of sensors coupled to the electrolytic reactor;
determine a reactor performance level based on a parameter value associated with at least one reactor parameter;
monitor a plurality of engine parameters;
determine an engine performance level based on a parameter value associated with at least one engine parameter;
predict a change in the engine performance level at a predetermined future time to forecast a future engine demand level, wherein the prediction is based on at least one or more telemetry parameters associated with the vehicle;
determine an ideal reactor performance level based on the future engine demand level; and
transmit instructions to the electrolytic reactor to modify at least one of electrical current supplied to the electrolytic reactor, electrical voltage supplied to the electrolytic reactor, and temperature of the electrolytic reactor, to regulate the electrolytic reactor in response to the determined ideal reactor performance level.

2. The ECU of claim 1, wherein the processor is further configured to:
determine an amount of hydrogen gas being generated by the electrolytic reactor by processing one or more parameter values associated with one or more reactor parameters; and
determine the ideal reactor performance level based additionally on the amount of hydrogen gas being produced.

3. The ECU of claim 1, wherein the processor is further configured to:
recalibrate the one or more of the engine parameters based on one or more of the plurality of reactor parameters.

4. The ECU of claim 1, wherein the processor is further configured to:
detect an occurrence of at least one of the plurality of reactor parameters existing outside a normal operating range; and
regulate the electrolytic reactor in response to the occurrence.

5. The ECU of claim 1, wherein the plurality of reactor parameters comprises at least one of: water tank level, electrolyte level, supplied electrical voltage, supplied electrical current, water tank temperature, reactor temperature, reactor leakage, water pump, gas flow, relative humidity, conductivity of electrolyte, resistance of electrolyte, and concentration of electrolyte.

6. The ECU of claim 1, wherein the plurality of engine parameters comprises at least one of: odometer, engine speed, fuel consumption, mass air pressure, mass air flow, mileage, distance, fuel rate, exhaust temperature, NOx levels, CO2 levels, O2 levels, engine instantaneous fuel economy, engine average fuel economy, engine inlet air mass flow rate, engine demand percent torque, engine percent load at current speed, transmission actual gear ratio, transmission current gear, engine cylinder combustion status, engine cylinder knock level, and after treatment intake NOx level preliminary FMI, drivetrain, vehicle speed, and GPS location.

7. The ECU of claim 1, wherein a first plurality of data is transmitted to a remote server and a second plurality of data is received from the remote server, the first plurality of data comprising parameter values associated with plurality of reactor parameters and the plurality of engine parameters, the reactor performance level, and the engine performance level, and the second plurality of data comprising the ideal reactor performance level and instructions to the ECU for achieving the ideal reactor performance level, the second plurality of data generated based on at least one of historical trends of the transmitted first plurality of data and comparison to other first plurality of data transmitted from other electronic control units in communication with the remote server.

8. The ECU of claim 7, wherein the processor communicates with the remote server to find similar engine conditions to determine the ideal reactor performance level.

9. The ECU of claim 1, wherein the ideal reactor performance level is determined based on priorities assigned to one or more engine performance indicators, wherein the engine performance indicators can be selected from the group consisting of fuel efficiency, emissions, engine torque, and engine horsepower.

10. The ECU of claim 1, further comprising a memory coupled to the processor, the memory being configured to store parameter values associated with the plurality of reactor parameters and the plurality of engine parameters, the reactor performance level, and the engine performance level.

11. A method for managing an on-demand electrolytic reactor for supplying hydrogen and oxygen gas to an internal combustion engine, the internal combustion engine being located in a vehicle, the method being performed by an electronic control unit (ECU) and comprising:
monitoring, by a processor of the ECU, a plurality of reactor parameters measured by a plurality of sensors coupled to the electrolytic reactor;
determining, by the processor, a reactor performance level based on a parameter value associated with at least one reactor parameter;
monitoring, by the processor, a plurality of engine parameters;
determining, by the processor, an engine performance level based on a parameter value associated with at least one engine parameter;
predicting, by the processor, a change in the engine performance level at a predetermined future time to forecast a future engine demand level, wherein the prediction is based on at least one or more telemetry parameters associated with the vehicle;
determining, by the processor, an ideal reactor performance level based on the future engine demand level; and
transmitting, by the processor, instructions to the electrolytic reactor to modify at least one of electrical current supplied to the electrolytic reactor, electrical voltage supplied to the electrolytic reactor, and temperature of the electrolytic reactor, to regulate the electrolytic reactor in response to the determined ideal reactor performance level.

12. The method of claim 11, further comprising:
determining, by the processor, an amount of hydrogen gas being generated by the electrolytic reactor, by processing one or more parameter values associated with one or more reactor parameters; and determining, by the processor, the ideal reactor performance level based additionally on the amount of hydrogen gas being produced.

13. The method of claim 11, further comprising:
recalibrating, by the processor, the one or more of the engine parameters based on one or more of the plurality of reactor parameters.

14. The method of claim 11, further comprising:
detecting, by the processor, an occurrence of at least one of the plurality of reactor parameters existing outside a normal operating range; and
regulating, by the processor, the electrolytic reactor in response to the occurrence.

15. The method of claim 11, wherein the plurality of reactor parameters comprises at least one of: water tank level, electrolyte level, supplied electrical voltage, supplied electrical current, water tank temperature, reactor temperature, reactor leakage, water pump, gas flow, relative humidity, conductivity of electrolyte, resistance of electrolyte, and concentration of electrolyte.

16. The method of claim 11, wherein the plurality of engine parameters comprises at least one of: odometer, engine speed, fuel consumption, mass air pressure, mass air flow, mileage, distance, fuel rate, exhaust temperature, NOx levels, CO2 levels, O2 levels, engine instantaneous fuel economy, engine average fuel economy, engine inlet air mass flow rate, engine demand percent torque, engine percent load at current speed, transmission actual gear ratio, transmission current gear, engine cylinder combustion status, engine cylinder knock level, and after treatment intake NOx level preliminary FMI, drivetrain, vehicle speed, and GPS location.

17. The method of claim 11, further comprising:
transmitting, by the processor, a first plurality of data to a remote server; and
receiving, by the processor, a second plurality of data from the remote server,
wherein the first plurality of data comprises parameter values associated with plurality of reactor parameters and the plurality of engine parameters, the reactor performance level, and the engine performance level, and the second plurality of data comprises the ideal reactor performance level and instructions to the ECU for achieving the ideal reactor performance level, the second plurality of data generated based on at least one of historical trends of the transmitted first plurality of data and comparison to other first plurality of data transmitted from other electronic control units in communication with the remote server.

18. The method of claim 17, further comprising communicating, by the processor, with the remote server to find similar engine conditions to determine the ideal reactor performance level.

19. The method of claim 11, wherein the ideal reactor performance level is determined based on priorities assigned to one or more engine performance indicators, wherein the engine performance indicators can be selected from the group consisting of fuel efficiency, emissions, engine torque, and engine horsepower.

20. The method of claim 11, further comprising storing, in a memory coupled to the processor, parameter values associated with the plurality of reactor parameters and the plurality of engine parameters, the reactor performance level, and the engine performance level.

* * * * *